US008384292B2

(12) United States Patent
Imam et al.

(10) Patent No.: US 8,384,292 B2
(45) Date of Patent: Feb. 26, 2013

(54) INRUSH CURRENT PROTECTION

(75) Inventors: Afroz M. Imam, Danvers, MA (US); Sivakumar Thangavelu, Billerica, MA (US)

(73) Assignee: Osram Sylvania Inc., Danvers, MA (US)

( * ) Notice: Subject to any disclaimer, the term of this patent is extended or adjusted under 35 U.S.C. 154(b) by 575 days.

(21) Appl. No.: 12/753,850

(22) Filed: Apr. 2, 2010

(65) Prior Publication Data

US 2011/0241550 A1 Oct. 6, 2011

(51) Int. Cl.
*H05B 37/00* (2006.01)
*H02H 1/00* (2006.01)

(52) U.S. Cl. ........... 315/119; 361/57; 361/111; 361/118

(58) Field of Classification Search .................. 315/291, 315/119, 227 R, 238, 229, 297, 306, 307–308, 315/294; 361/111, 118, 435, 93, 2, 30, 57, 361/63, 65

See application file for complete search history.

(56) References Cited

U.S. PATENT DOCUMENTS 7,957,117 B2 * 6/2011 Divan .......................... 361/118
2010/0289418 A1 * 11/2010 Langovsky .................. 315/210

* cited by examiner

*Primary Examiner* — Jacob Y Choi
*Assistant Examiner* — Henry Luong
(74) *Attorney, Agent, or Firm* — Shaun P. Montana

(57) ABSTRACT

Methods of protecting an electrical device, such as a ballast, from damage due to an inrush current, and devices incorporating such methods, are disclosed. A loss of input power received by the ballast is detected. In response, the ballast is entered into a standby mode. The ballast is able to remain in the standby mode for a standby period of time. The input power is monitored during the standby period of time to measure a start time. Measurement of the start time is triggered by the ballast receiving input power again. The ballast is entered into an active mode when the measured start time exceeds a protection time. The protection time corresponds to an amount of time needed for an inrush current to dissipate following input power again being received by the ballast, protecting the ballast from possible damage due to the inrush current.

10 Claims, 6 Drawing Sheets

INRUSH CURRENT PROTECTION

TECHNICAL FIELD

The present invention relates to electronic circuits, and more specifically, to electronic circuits used in electrical devices, such as but not limited to lighting ballasts.

BACKGROUND

Inrush current has long been an issue for designers of electrical devices to deal with. When an electrical device is first turned on, that is, first provided power from a power source, the instantaneous current drawn by the device (known as the inrush current) is typically much larger than the steady state current drawn by the device. In some devices, inrush current is due to an input capacitance needing to charge. Once the input capacitance is charged, the current reaches a steady state.

Inrush current, if not compensated for or otherwise protected from, may cause damage to the electrical components of the electrical device. A variety of protection circuits and components are known in the art to limit, or in some cases eliminate, possible damage that may be caused by inrush current. Such circuits/components are vital to long-term operation and duration of electrical devices, particularly devices that turn on and off repeatedly over a period of time.

SUMMARY

Conventional techniques to protect electrical devices from inrush current suffer from a variety of deficiencies. For example, in some ballasts, the conventional protection for inrush current is a by-pass diode that is located between the output of a ballast rectifier circuit and the DC rail of the ballast. However, the by-pass diode is not always to prevent components of the ballast from operating during situations where inrush current is present. This can lead to failure of one or more of those components, and ultimately, failure of the ballast before its expected lifetime has passed.

Embodiments described herein provide methods and systems for overcoming problems with conventional techniques for protecting electrical devices from inrush current. Embodiments described herein may utilize a component already present or easily added to electrical devices: a microcontroller. As described herein with specific reference to a ballast for one or more lamps, but generally applicable to any electrical device, a microcontroller may be programmed to operate one or more components of the electrical device in a way that avoids those components being turned "on" (i.e., receiving enough power to operate) during the presence of an inrush current. After the inrush current is no longer present, the microcontroller turns the one or more components "on". The one or more components suffer no damage from the inrush current because the one or more components were not operating during the same time as the inrush current was present.

In an embodiment, there is provided a method of protecting a ballast housing a lamp from damage due to an inrush current. The method includes: detecting a loss of input power received by the ballast; in response, entering the ballast into a standby mode, wherein the ballast is able to remain in the standby mode for a standby period of time; monitoring the input power during the standby period of time to measure a start time, measurement of the start time being triggered by the ballast receiving input power again; and entering the ballast into an active mode when the measured start time exceeds a protection time, wherein the protection time corresponds to an amount of time needed for an inrush current to dissipate following input power again being received by the ballast, resulting in protection of the ballast from possible damage due to the inrush current.

In a related embodiment, detecting may include detecting a loss of input power to the ballast; and in response, entering a microcontroller of the ballast into a low power mode. In a further related embodiment, monitoring may include monitoring, via the microcontroller, the input power periodically during the standby period of time to measure a start time, measurement of the start time beginning when the microcontroller detects that the ballast begins to receive input power again. In another further related embodiment, entering the ballast into a standby mode may include: in response, using the microcontroller to enter the ballast into a standby mode, wherein the ballast is able to remain in the standby mode for a standby period of time; and entering the ballast into an active mode may include: using the microcontroller to enter the ballast into an active mode when the measured start time exceeds a protection time, wherein the protection time corresponds to an amount of time needed for an inrush current to dissipate following restoration of input power to the ballast, resulting in protection of the ballast from possible damage due to the inrush current. In yet another further related embodiment, the method may further include resetting the microcontroller after the ballast enters the active mode.

In another related embodiment, entering the ballast into a standby mode may include: in response, entering the ballast into a standby mode, wherein the ballast is able to remain in the standby mode for a standby period of time; and prohibiting a circuit from turning on until the ballast is in an active mode. In a further related embodiment, entering the ballast into an active mode may include entering the ballast into an active mode when the measured start time exceeds a protection time, wherein the protection time corresponds to an amount of time needed for an inrush current to dissipate following input power again being received by the ballast, resulting in protection of the ballast from possible damage due to the inrush current; and allowing the circuit to turn on upon the ballast entering the active mode. In a further related embodiment, prohibiting may include prohibiting a PFC circuit from turning on until the ballast is in an active mode; and allowing may include allowing the PFC circuit to turn on upon the ballast entering the active mode.

In another embodiment, there is provided a ballast. The ballast includes a power source, an electronic circuit, and a microcontroller. The microcontroller includes a memory, a processor, an input/output mechanism, and an interconnection mechanism coupling the memory, the processor, and the input/output mechanism, allowing communication therebetween. The memory is encoded with an inrush current protection application that, when executed in the processor, provides an inrush current protection process that protects the ballast from damage due to an inrush current, by causing the microcontroller to perform operations of: detecting a loss of input power received by the ballast; in response, entering the ballast into a standby mode, wherein the ballast is able to remain in the standby mode for a standby period of time; monitoring the input power during the standby period of time to measure a start time, measurement of the start time being triggered by the ballast receiving input power again; and entering the ballast into an active mode when the measured start time exceeds a protection time, wherein the protection time corresponds to an amount of time needed for an inrush current to dissipate following input power again being received by the ballast, resulting in protection of the ballast from possible damage due to the inrush current.

In a related embodiment, the operation of detecting may include detecting a loss of input power to the ballast; and in response, entering the microcontroller into a low power mode. In a further related embodiment, the operation of monitoring may include monitoring the input power periodically during the standby period of time to measure a start time, measurement of the start time beginning when the microcontroller detects that the ballast begins to receive input power again. In another further related embodiment, the microcontroller may further perform the operation of resetting the microcontroller after the ballast enters the active mode.

In another related embodiment, the operation of entering the ballast into a standby mode may include: in response, entering the ballast into a standby mode, wherein the ballast is able to remain in the standby mode for a standby period of time; and prohibiting a circuit from turning on until the ballast is in an active mode. In a further related embodiment, the operation of entering the ballast into an active mode may include entering the ballast into an active mode when the measured start time exceeds a protection time, wherein the protection time corresponds to an amount of time needed for an inrush current to dissipate following input power again being received by the ballast, resulting in protection of the ballast from possible damage due to the inrush current; and allowing the circuit to turn on upon the ballast entering the active mode. In a further related embodiment, the operation of prohibiting may include prohibiting a PFC circuit from turning on until the ballast is in an active mode, and the operation of allowing may include allowing the PFC circuit to turn on upon the ballast entering the active mode.

In yet another related embodiment, the ballast may further include a capacitor, wherein the capacitor stores power upon the ballast receiving input power, and wherein the capacitor discharges the stored power upon the ballast losing input power; and the operation of entering the ballast into a standby mode may include: in response, entering the ballast into a standby mode, wherein the ballast is able to remain in the standby mode for a standby period of time, wherein the standby period of time is based on the stored power of the capacitor.

It is to be understood that the microcontroller of the present application may be embodied solely as a software program, or as a software program operating in conjunction with corresponding hardware. Embodiments may also be implemented in a variety of computing devices without limitation, whether such devices are located locally with the electrical device to be protected from inrush current or remotely.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Though embodiments are described herein in reference to a particular type of electrical device (a ballast housing a lamp), embodiments are capable of being used with any type of electrical device that receives power and may experience inrush current, either directly or indirectly. Such use is within the scope of those of ordinary skill in the state of the art. Further, embodiments may be used with more than just one single electrical device. That is, embodiments may be used with two or more electrical devices (e.g., two or more ballasts, etc).

Figure 1:
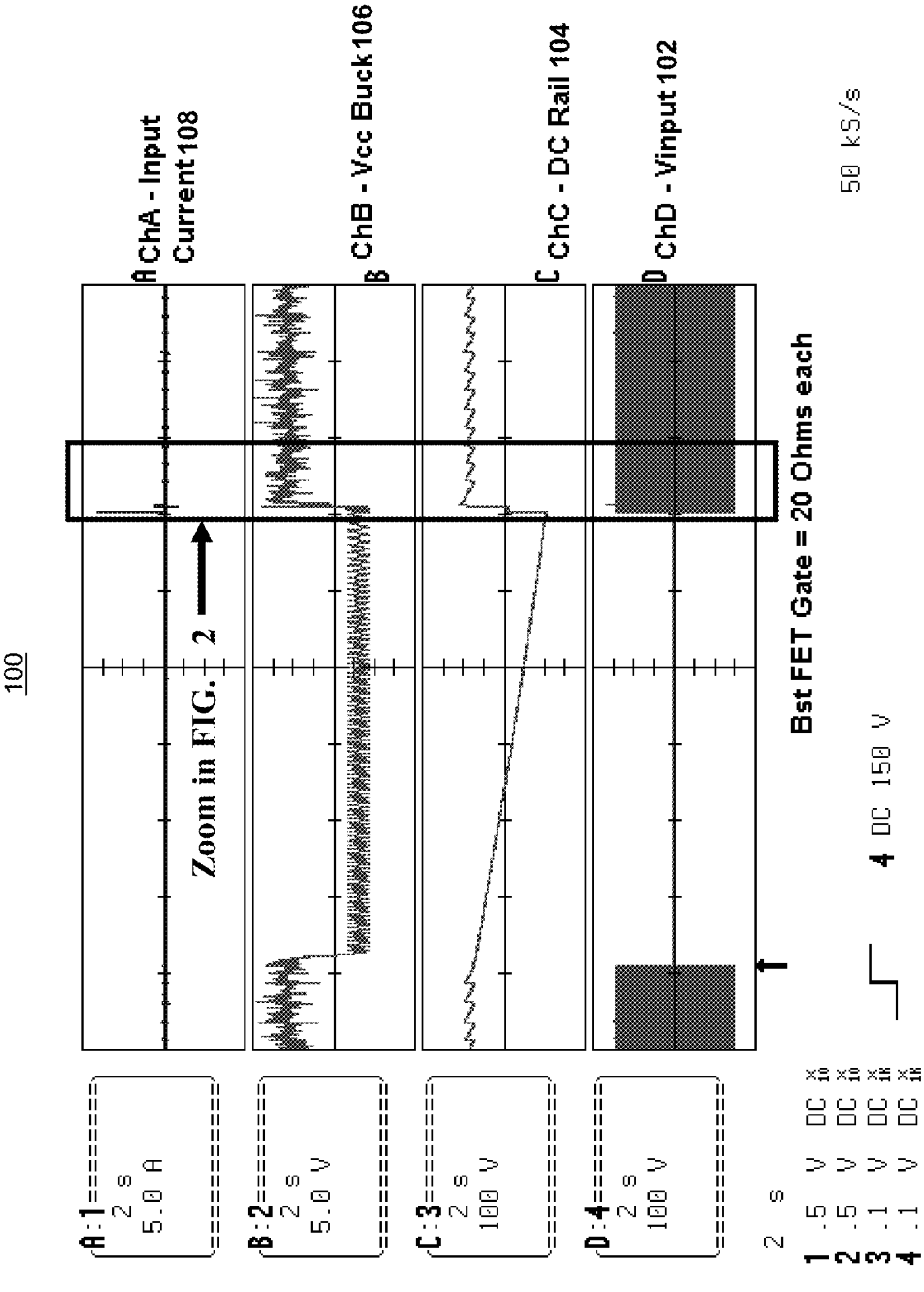
FIG. 1 is a graph of various signals of a ballast as measured over a period of time, to show how a loss and resumption of input power may result in an inrush current.
Figure 2:
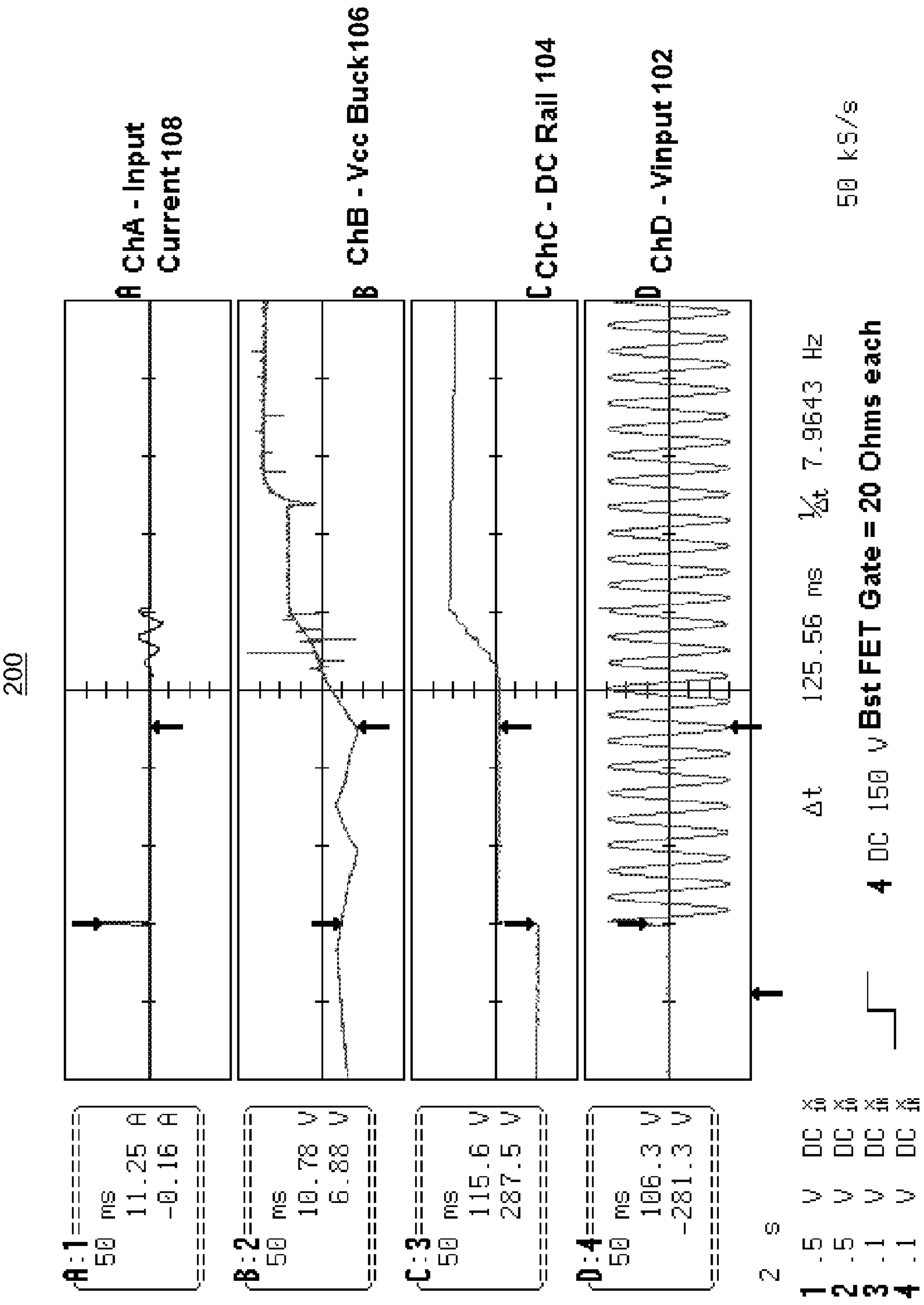
FIG. 2 is a close up (zoomed in) portion of FIG. 1 to more clearly identify when an inrush current is present in relation to other signals shown.
Figure 3:
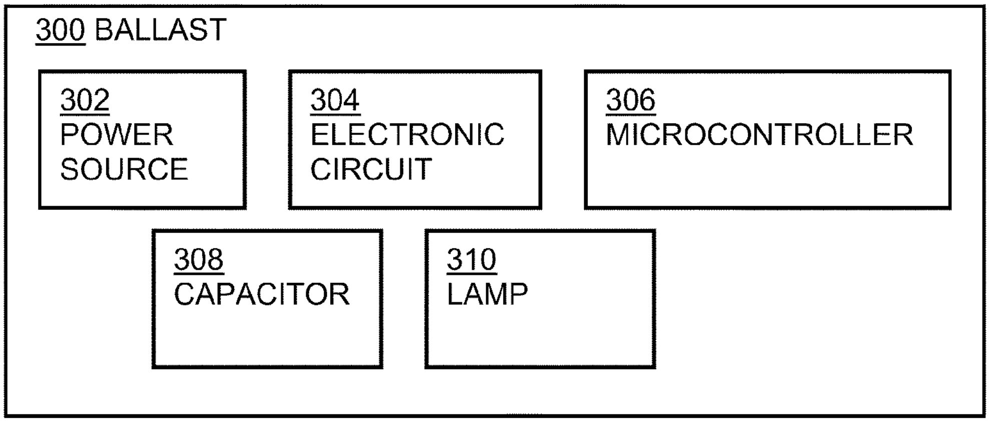
FIG. 3 is a high-level block diagram of a ballast according to embodiments described herein, including a microcontroller.

FIG. 1 shows a graph 100 displaying readings 102, 104, 106, 108 of various signals taken from a ballast housing a lamp (more specifically, a ballast housing a metal halide high-intensity discharge lamp, such as the ballast 300 shown in FIG. 3) according to embodiments described herein. In FIG. 1, the readings 102, 104, 106, 108 were taken with the ballast running in open circuit voltage (OCV) mode (that is, the ballast had a light load on it), however similar conditions may be present regardless of the load. As seen in FIG. 1, when input power Vinput 102 is lost, a DC Rail voltage 104 of the ballast and a Vcc Buck voltage 106 both decrease. When input power Vinput 102 is reapplied, there is a spike in Input Current 108 (shown in greater detail in FIG. 2, which is a graph 200 showing a zoomed in portion of FIG. 1 as indicated in FIG. 1). Without protection from this inrush current, one or more components of the ballast may fail. However, by turning off such component(s) when the input power Vinput 102 is detected to have been lost, and keeping those component(s) off until a certain time after the DC Rail voltage 104 has charged to the peak of the line, the inrush current will have dissipated and would pose no threat to the component(s). In embodiments described herein, a microcontroller located within the ballast is programmed to protect the component(s) in this way.

FIG. 3, as mentioned above, shows a generic block diagram of a ballast 300. The ballast 300 includes a power source 302, an electronic circuit 304, a microcontroller 306, a capacitor 308, and a lamp 310. The power source 302 may be any type of power source known in the art, and in some embodiments, is a rectifier providing rectified power from a power source internal to the ballast, such as a power supply, or a power source external to the ballast, such as a power line. The electronic circuit 304 may be any type of electronic circuit or other electronic component found in a ballast, and in some embodiments, is a power factor correction (PFC) circuit. Of course the ballast 300 may include many electronic circuits/components. The capacitor 308 is a charging device typically found in a ballast as well as in other circuits/devices. Should the ballast 300 lose its input power, components within the ballast (such as the microcontroller 306) may operate for a period of time by drawing power stored within the capacitor 308. The lamp 310 may be any type of lamp capable of being powered by a ballast.

Figure 4:
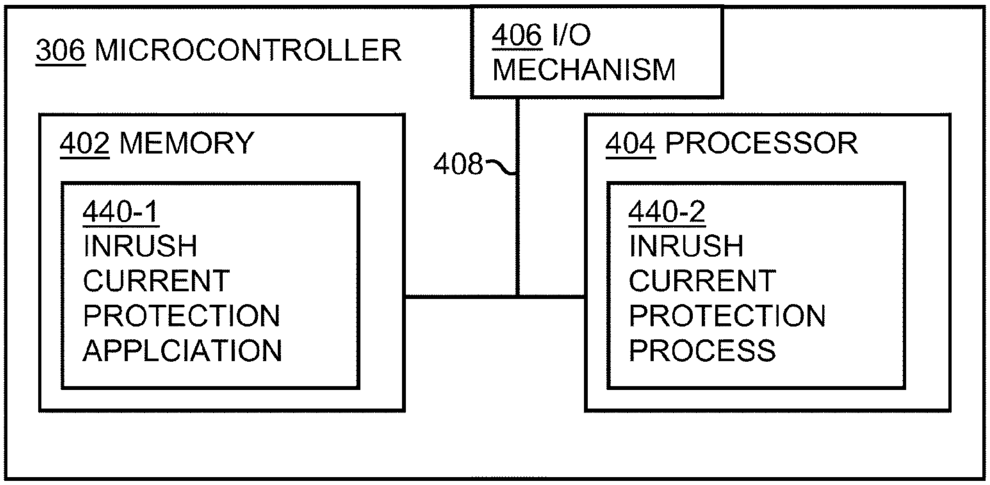
FIG. 4 is a high-level block diagram of a microcontroller, such as found in the ballast of FIG. 3, according to embodiments described herein.

The microcontroller 306 is shown in more detail in FIG. 4. FIG. 4 as a block diagram illustrating an example architecture of the microcontroller 306 that executes, runs, interprets, operates or otherwise performs an inrush current protection application 440-1 and an inrush current protection process 440-2 suitable for use in explaining example configurations disclosed herein. As shown in this example, the microcontroller 306 includes a memory 402, a processor 404, an input/output mechanism 406, and an interconnection mechanism 408. The input/output mechanism 406 is capable of both receiving signals (input) from other components of the ballast 300 and transmitting signals (output) to other components of the ballast 300. The interconnection mechanism 408, which may be but is not limited to a data bus or other circuitry, couples the memory 402, the processor 404, and the input/output mechanism 406, allowing communication therebetween. In some embodiments, the microcontroller 306 may include a separate communications interface (not shown in FIG. 4), that allows the microcontroller 306 to communicate with other devices (e.g., other microcontrollers within the ballast 300, microcontrollers external to the ballast 300, etc). In some embodiments, the input/output mechanism 406 may include such a communications interface.

The memory 402 is any type of storage medium that is capable of being read by the processor 404, and in this example is encoded with an inrush current protection application 440-1 that includes an inrush current protection process 440-2. The inrush current protection application 440-1 may be embodied as software code such as data and/or logic instructions (e.g., code stored in the memory 402 or on another readable storage medium) that supports processing functionality according to different embodiments described herein. During operation of the microcontroller 306, the processor 404 accesses the memory 402 via the interconnection mechanism 408 in order to launch, run, execute, interpret or otherwise perform the logic instructions of the inrush current protection application 440-1. Execution of the inrush current protection application 440-1 in this manner produces processing functionality in an inrush current protection process 440-2. In other words, the inrush current protection process 440-2 represents one or more portions or runtime instances of the inrush current protection application 440-1 performing or executing within or upon the processor 404 in the microcontroller 306 at runtime.

It is noted that example configurations disclosed herein include the inrush current protection application 440-1 itself including the inrush current protection process 440-2 (i.e., in the form of un-executed or non-performing logic instructions and/or data). The inrush current protection application 440-1 may be stored on a readable storage medium within the microcontroller 306 or a readable storage medium external to the microcontroller 306, such as but not limited to a floppy disk, hard disk, electronic, magnetic, optical or other readable storage medium. The inrush current protection application 440-1 may also be stored in a memory system, whether internal or external to the microprocessor 306, such as but not limited to in firmware, read only memory (ROM), or as executable code in, for example, Random Access Memory (RAM). In addition to these embodiments, it should also be noted that other embodiments herein include the execution of the inrush current protection application 440-1 in the processor 404 of the microcontroller 306 as the inrush current protection process 440-2. Those skilled in the art will understand that the microcontroller 306 may include other processes and/or software and hardware components which are not shown or otherwise described herein.

Figure 5:
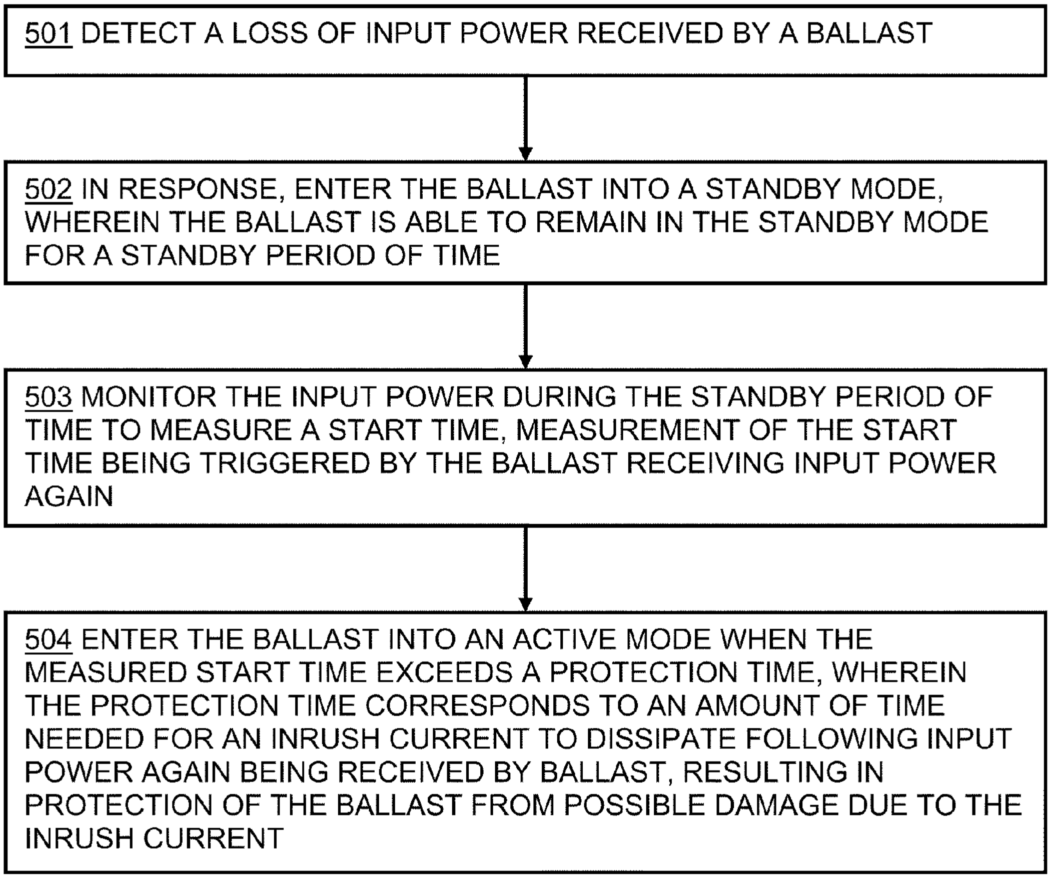
FIGS. 5-7 are flowcharts of various procedures performed by the microcontroller of FIG. 4/the ballast of FIG. 3 to protect the ballast and its components from inrush current.
Figure 6:
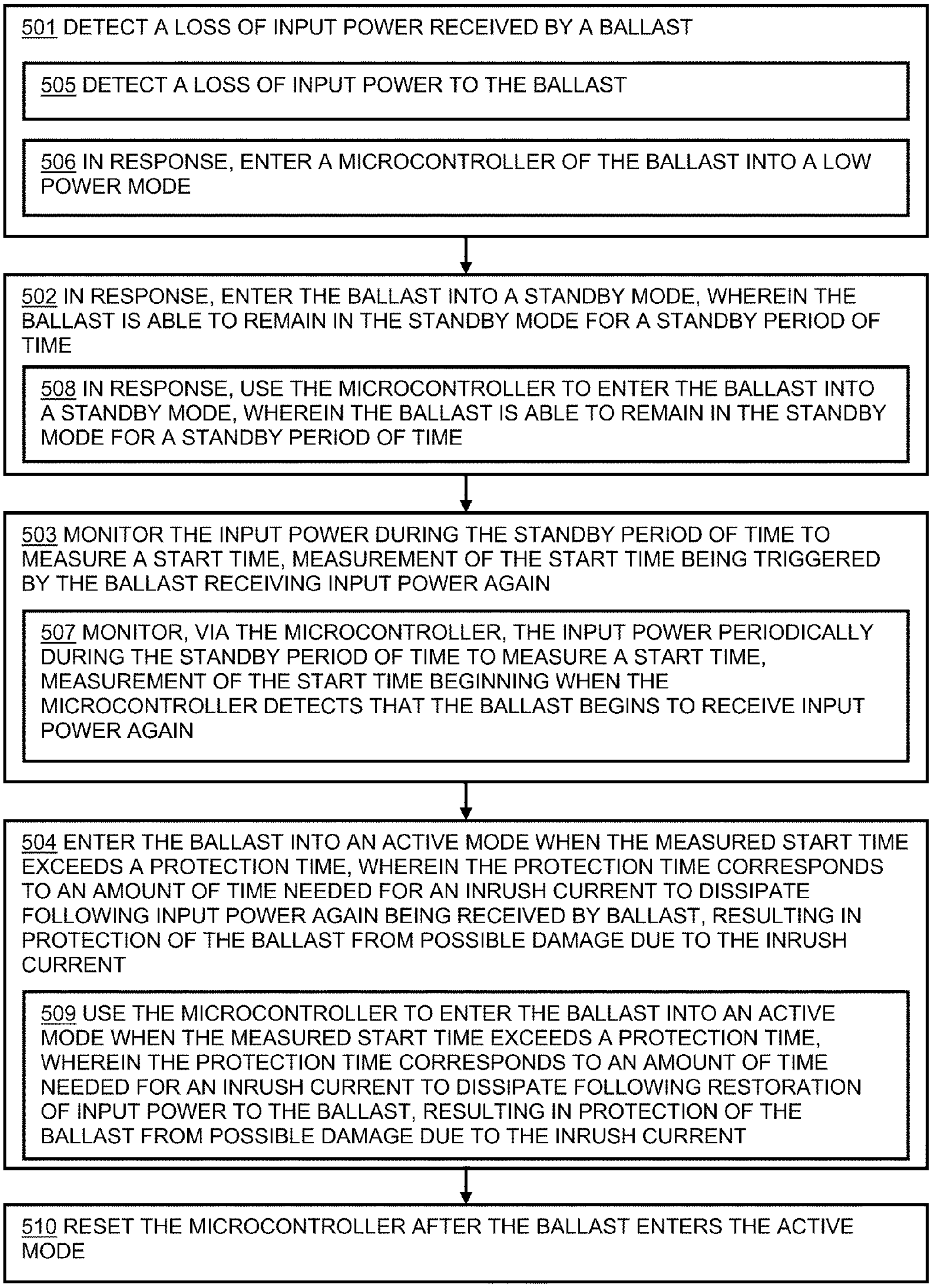
Figure 7:
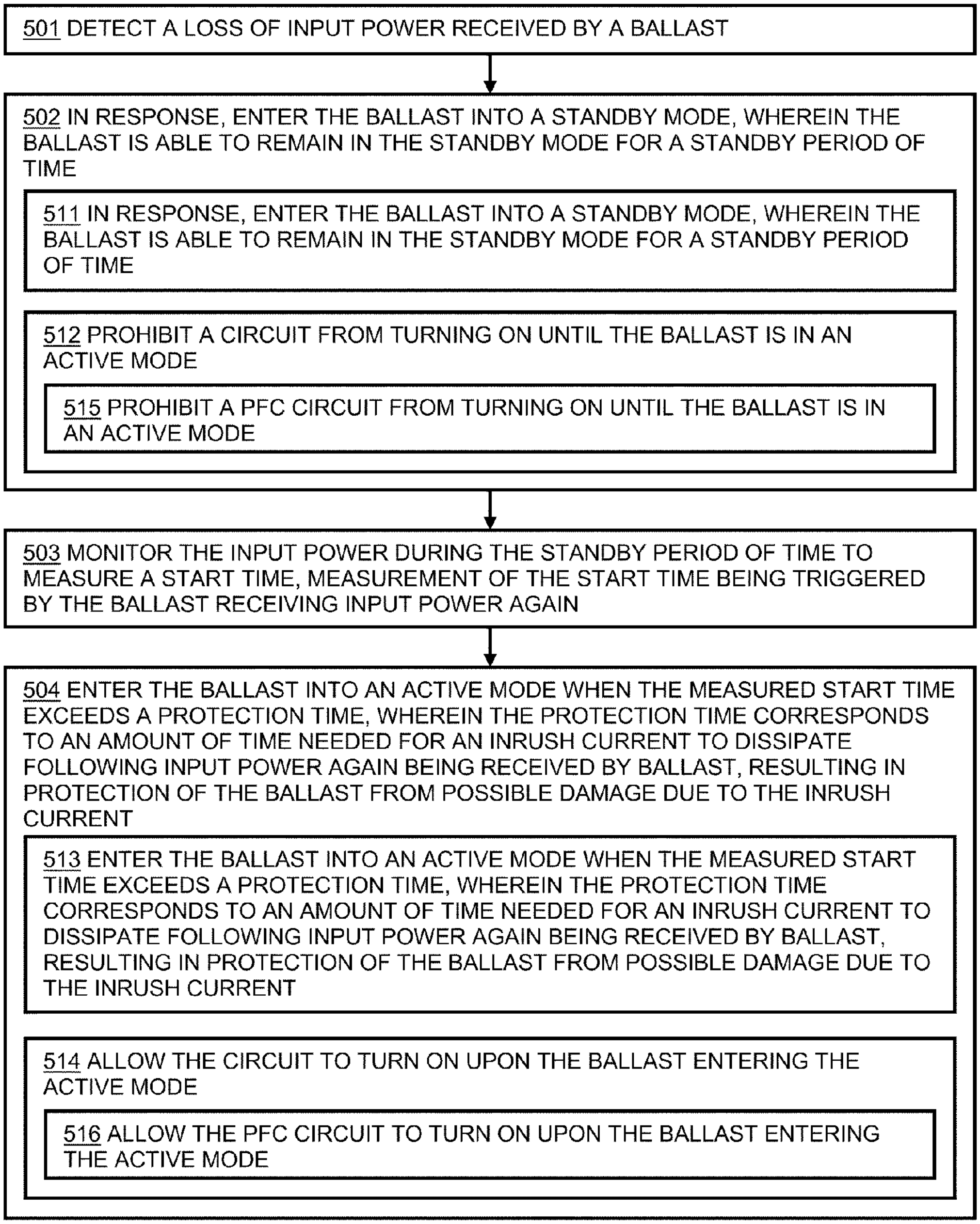

A number of flowcharts of the presently disclosed method are illustrated in FIGS. 5-7. The rectangular elements are herein denoted "processing blocks" and represent software instructions or groups of instructions. Alternatively, the processing blocks represent steps performed by functionally equivalent circuits such as a digital signal processor circuit or an application specific integrated circuit (ASIC). The flowcharts do not depict the syntax of any particular programming language. Rather, the flowcharts illustrate the functional information one of ordinary skill in the art requires to fabricate circuits or to generate software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order. More specifically, FIGS. 5-7 illustrate various flowcharts of procedures performed by the microcontroller 306 when protecting a ballast from inrush current according to embodiments described herein.

Note that, as used herein, any actions taken/operations performed by the inrush current protection application 440-1/inrush current protection process 440-2 may be construed, in some embodiments, to be actions taken/operations performed by the microcontroller 306, as the processor 404 within the microcontroller 306 executes the inrush current protection application 440-1 as the inrush current protection process 440-2.

As shown in FIGS. 5-7, the inrush current protection application 440-1 executing on the processor 404 of the microcontroller 306 as the inrush current protection process 440-2 detects a loss of input power received by the ballast 300, step 501. The ballast 300 may lose input power for any variety of reasons, such as but not limited to a failure in the wires carrying power to the ballast; a blackout, brownout, or other loss of power on the electrical grid in the area where the ballast is located; the failure or accidentally deactivation of a switch on the wires carrying power to the ballast; and the like. The inrush current protection process 440-2 may detect the loss of input power to the ballast 300 in any known way. For example, the microcontroller 306 on which the inrush current protection process 440-2 is running may be directly connected to the input power of the ballast 300, and thus the inrush current protection process 440-2 may simply need to monitor the pin of the microcontroller 306 receiving that signal. Alternatively, or additionally, the inrush current protection process 440-2 may use a sensor or other equivalent component capable of monitoring the input power, such that the sensor/other component notifies the inrush current protection process 440-2 when the input power is lost.

In response to detecting the loss of input power, the inrush current protection process 440-2 enters the ballast 300 into a standby mode, step 502. During the standby mode, components of the ballast 300 are able to function for a time from power stored within the capacitor 308. In some embodiments, the capacitor 308 begins to discharge its stored power upon the loss of input power to the ballast 300. However, the power provided by the capacitor 308 is regulated, such that one or more components of the ballast 300 that may affected by inrush current are prohibited from receiving enough power to turn "on" (i.e., be able to operate). This allows for such components to be protected should input power be restored to the ballast 300, and an inrush current result.

The ballast 300 is able to remain in the standby mode for a standby period of time. The standby period of time represents the amount of time following the loss of input power during which components of the ballast 300 are able to operate as needed from a secondary power source/supply. In some embodiments, the capacitor 308 acts as that secondary power source/supply, and thus in such embodiments, the standby period of time is based, at least in part, on the amount of power stored by the capacitor 308. Of course, the number of components of the ballast 300 which require power from the secondary power source/supply, whether the capacitor 308 or another source, as well as the amount of power needed to operate those components, will also affect the standby period of time. Further, whether the secondary power source/supply is the capacitor 308 or another source, the amount of power available to components of the ballast 300 will also affect the standby period of time. Thus, in some embodiments, when the inrush current protection process 440-2 detects a loss of input power received by the ballast 300, step 501/505, in response, the inrush current protection process 440-2 also enters a microcontroller 306 of the ballast 300 into a low power mode, step 506. This allows the microcontroller 306 to operate with reduced power, both due to the loss of input power to the ballast 300 and in recognition that the power provided by the capacitor 308 (or other secondary power source/supply) is limited. When in low power mode, the microcontroller 306 performs operations in a way to conserve power. For example, the microcontroller 306, when in low power mode, may only perform some operations and not all the operations it would usually perform in a non-low power mode. Alternatively, or additionally, the microcontroller 306, when in low power mode, may cycle between being active ("on", i.e. operating) and inactive ("off", i.e., not operating). That is, the microcontroller 306 may perform one or more of its operations only periodically instead of continuously. This conserves power being drawn from the capacitor 308 (or other secondary power source/supply), allowing the microcontroller 306 to stay at least partially operational for as long as possible and to help extend the standby period of time for as long as possible. When the standby period of time has reached its end, that is, the capacitor 308 (or secondary power source/supply) is no longer able to supply enough power to operate components of the ballast (including the microcontroller 306), the ballast 300 shuts down completely and must be re-started. Thus, as long as there is enough power being provided by the capacitor 308 (or secondary power source/supply) to the microcontroller 306 so that the microcontroller 306 is able to operate at least partially, the standby period of time will continue.

In some embodiments, when the inrush current protection process 440-2 enters the ballast into a standby mode, step 502, the inrush current protection process 440-2 enters the ballast into a standby mode, wherein the ballast is able to remain in the standby mode for a standby period of time, step 511 and the inrush current protection process 440-2 prohibits a circuit from turning on until the ballast is in an active mode, step 512. That circuit may be any circuit or other component of the ballast 300, including but not limited to components connected to the ballast 300 (whether internal to the ballast 300 or external to the ballast 300) which the microcontroller 306/the inrush current protection process 440-2 is able to control. In some embodiments, that circuit is a PFC circuit, such that the inrush current protection process 440-2 prohibits a PFC circuit from turning on until the ballast is in an active mode, step 515.

Once the inrush current protection process 440-2 has entered the ballast 300 into standby mode, the inrush current protection process 440-2 monitors the input power during the standby period of time to measure a start time, step 503. The measurement of the start time by the inrush current protection process 440-2 is triggered by the ballast 300 receiving input power again. That is, the inrush current protection process 440-2 begins to measure the start time when the inrush current protection process 440-2 becomes aware of the ballast 300 again receiving input power. The inrush current protection process 440-2 may become aware (i.e., detect) that the ballast 300 is again receiving input power in any known way, including but not limited to in the same way the inrush current protection process 440-2 detects that the ballast 300 had lost input power. The start time is described in greater detail below.

In some embodiments, when the inrush current protection process 440-2 monitors the input power, step 503, the inrush current protection process 440-2 monitors, via the microcontroller 306, the input power periodically during the standby period of time to measure a start time, step 507. Here, the inrush current protection process 440-2 begins to measure the start time when the microcontroller 306 detects that the ballast 300 begins to receive input power again. As above, the microcontroller 306 may detect that the ballast 300 begins to receive input power again in any known way, including but not limited to how the microcontroller 306/inrush current protection process 440-2 detect that the ballast 300 lost input power.

When the measured start time exceeds a protection time, the inrush current protection process 440-2 enters the ballast 300 into an active mode, step 504. The active mode of the ballast 300 is when all of the components of the ballast 300 are being turned back "on" and then reach a normal operating mode. That is, within a period of time following the ballast 300 being put in active mode, the ballast 300 should be performing normally (i.e., without error(s)) or as close to normal operation as possible. The protection time corresponds to an amount of time needed for an inrush current to dissipate following input power again being received by the ballast 300. In some embodiments, the protection time may be 100 milliseconds (ms), 125 ms, or 150 ms. The protection time may, in some embodiments, also or alternatively be equivalent to the amount of time, after the ballast 300 is again receiving input power, the microcontroller 306 needs to leave low power mode and return to normal (i.e., full power) mode. In such embodiments, the inrush current protection process 440-2 may not need to measure the start time but rather may simply need to, upon the microprocessor 306 itself returning to normal (i.e., full power) mode, enter the ballast 300 into its active mode. Because the protection time is, by definition, longer than the amount of time needed for the inrush current (due to the ballast 300 again receiving input power) to dissipate, the ballast 300 and its components are protected from possible damage due to the inrush current.

In some embodiments where the inrush current protection process 440-2 has prohibited a circuit from turning on until the ballast 300 is in an active mode, when the inrush current protection process 440-2 enters the ballast 300 into its active mode, step 504, the inrush current protection process 440-2 enters the ballast into an active mode when the measured start time exceeds a protection time, wherein the protection time corresponds to an amount of time needed for an inrush current to dissipate following input power again being received by the ballast, resulting in protection of the ballast from possible damage due to the inrush current, step 513, and the inrush current protection process 440-2 also allows the circuit to turn on upon the ballast entering the active mode, step 514. In some embodiments, where the circuit the inrush current protection process 440-2 prohibited from turning on was a PFC circuit, the inrush current protection process 440-2 allows the PFC circuit to turn on upon the ballast entering the active mode, step 515. Of course, any circuit within or external to the ballast 300 over which the inrush current protection process 440-2 is able to exercise control, either directly or indirectly, may be so prohibited from turning on and later may be turned on.

In some embodiments, the inrush current protection process 440-2 uses the microcontroller 306 to enter the ballast into the standby mode, step 508, and similarly uses the microcontroller to enter the ballast into the active mode, step 509. In some embodiments, after the inrush current protection process 440-2 (or the microcontroller 306) enter the ballast into the active mode, the inrush current protection process 440-2 resets the microcontroller 306, step 510. This allows the microcontroller 306 to be able to again detect if a loss of input power to the ballast 300 occurs, as described above, and then act to protect the ballast 300 from inrush current.

Though the methods and devices/systems described herein are described with respect to a ballast capable of operating a lamp, the inrush current protection application 440-1 executing on a processor as the inrush current protection process 440-2 and/or the operations performed by the inrush current protection application 440-1/inrush current protection process 440-2 may be used with any known electrical device that is capable of being controlled by a microcontroller. For a generic electrical device, the electrical device must either contain a microcontroller or other equivalent computing device, or must be in communication with a microcontroller or other equivalent computing device. The procedure as described herein with respect to a ballast is the same. That is, the microcontroller or other equivalent computing device (or an application executing as a process thereon) first detects a loss of input power received by the electrical device. The microprocessor then, in response, enters the electrical device into a standby mode. The electrical device is able to remain in the standby mode for a standby period of time. During the standby mode, one or more components of the electrical device do not receive enough power to operate, and may be prohibited from receiving enough power to operate until the microcontroller allows it. The standby period of time is determined by the secondary power source that is supplying at least the microcontroller, if not any other components of the electrical device, with power. The microcontroller monitors the input power during the standby period of time to measure a start time, where measurement of the start time is triggered by the electrical device receiving input power again. Finally, the microcontroller enters the ballast into an active mode when the measured start time exceeds a protection time, wherein the protection time corresponds to an amount of time needed for an inrush current to dissipate following input power again being received by the electrical device, resulting in protection of the electrical device from possible damage due to the inrush current.

The methods and devices/systems described herein are not limited to a particular hardware or software configuration, and may find applicability in many computing or processing environments. The methods and devices/systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

References to “a microprocessor” and “a processor”, or “the microprocessor” and “the processor,” may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such “microprocessor” or “processor” terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word “substantially” may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles “a” or “an” to modify a noun may be understood to be used for convenience and to include one, or more than one, of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method of protecting a ballast from damage due to an inrush current using a microcontroller, the method comprising steps of:

detecting a loss of input power received by the ballast;

in response, entering the ballast into a standby mode, wherein the ballast is able to remain in the standby mode for a standby period of time; and monitoring the input power during the standby period of time to measure a start time, measurement of the start time being triggered by the ballast receiving input power again; and entering the ballast into an active mode when the measured start time exceeds a protection time, wherein the protection time corresponds to an amount of time needed for an inrush current to dissipate following input power again being received by the ballast, resulting in protection of the ballast from possible damage due to the inrush current; and allowing the circuit to turn on upon the ballast entering the active mode; and prohibiting a PFC circuit from turning on until the ballast is in the active mode; and wherein allowing comprises:

allowing the PFC circuit to turn on upon the ballast entering the active mode.

2. The method of claim 1 wherein detecting comprises:

detecting a loss of input power to the ballast; and in response, entering the microcontroller of the ballast into a low power mode.

3. The method of claim 2 wherein monitoring comprises:

monitoring, via the microcontroller, the input power periodically during the standby period of time to measure the start time, measurement of the start time beginning when the microcontroller detects that the ballast begins to receive input power again.

4. The method of claim 2 wherein entering the ballast into a standby mode comprises:

in response, using the microcontroller to enter the ballast into the standby mode, wherein the ballast is able to remain in the standby mode for the standby period of time;

and wherein entering the ballast into the active mode comprises:

using the microcontroller to enter the ballast into an active mode when the measured start time exceeds the protection time, wherein the protection time corresponds to the amount of time needed for the inrush current to dissipate following restoration of input power to the ballast, resulting in protection of the ballast from possible damage due to the inrush current.

5. The method of claim 2 further comprising the step of:

resetting the microcontroller after the ballast enters the active mode.

6. A ballast comprising:

a power source;

an electronic circuit; and a microcontroller, wherein the microcontroller comprises:

a memory;

a processor;

an input/output mechanism; and an interconnection mechanism coupling the memory, the processor, and the input/output mechanism, allowing communication there between;

wherein the memory is encoded with an inrush current protection application that, when executed in the processor, provides the inrush current protection process that protects the ballast from damage due to the inrush current, by causing the microcontroller to perform operations of:

detecting a loss of input power received by the ballast;

in response, entering the ballast into a standby mode, wherein the ballast is able to remain in the standby mode for a standby period of time; and monitoring the input power during the standby period of time to measure a start time, measurement of the start time being triggered by the ballast receiving input power again; and entering the ballast into an active mode when the measured start time exceeds a protection time, wherein the protection time corresponds to an amount of time needed for the inrush current to dissipate following input power again being received by the ballast, resulting in protection of the ballast from possible damage due to the inrush current; and allowing the circuit to turn on upon the ballast entering the active mode; and prohibiting a PFC circuit from turning on until the ballast is in the active mode; and wherein the operation of allowing comprises:

allowing the PFC circuit to turn on upon the ballast entering the active mode.

7. The ballast of claim 6 wherein the operation of detecting comprises:

detecting the loss of input power to the ballast; and in response, entering the microcontroller into a low power mode.

8. The ballast of claim 7 wherein the operation of monitoring comprises:

monitoring the input power periodically during the standby period of time to measure the start time, measurement of the start time beginning when the microcontroller detects that the ballast begins to receive input power again.

9. The ballast of claim 7 wherein the microcontroller further performs the operation of:

resetting the microcontroller after the ballast enters the active mode.

10. The ballast of claim 6 further comprising:

a capacitor, wherein the capacitor stores power upon the ballast receiving input power, and wherein the capacitor discharges the stored power upon the ballast losing input power;

and wherein the operation of entering the ballast into the standby mode comprises:

in response, entering the ballast into a standby mode, wherein the ballast is able to remain in the standby mode for the standby period of time, wherein the standby period of time is based on the stored power of the capacitor.

* * * * *